US008818433B2

(12) United States Patent
Steer et al.

(10) Patent No.: US 8,818,433 B2
(45) Date of Patent: Aug. 26, 2014

(54) SYSTEM AND METHOD FOR MOBILE NETWORK INTER-DEVICE COMMUNICATIONS

(75) Inventors: David Steer, Nepean (CA); Robert Novak, Ottawa (CA)

(73) Assignee: BlackBerry Limited, Waterloo (CA)

( * ) Notice: Subject to any disclaimer, the term of this patent is extended or adjusted under 35 U.S.C. 154(b) by 30 days.

(21) Appl. No.: 13/391,365

(22) PCT Filed: Aug. 19, 2010

(86) PCT No.: PCT/CA2010/001259
§ 371 (c)(1),
(2), (4) Date: Feb. 20, 2012

(87) PCT Pub. No.: WO2011/020180
PCT Pub. Date: Feb. 24, 2011

(65) Prior Publication Data
US 2012/0149408 A1    Jun. 14, 2012

Related U.S. Application Data

(60) Provisional application No. 61/235,916, filed on Aug. 21, 2009.

(51) Int. Cl.
*H04W 4/00*     (2009.01)
(52) U.S. Cl.
USPC ........ 455/466; 455/414.1; 455/419; 455/436; 455/518; 455/519; 370/310.2; 370/328; 370/331; 370/338
(58) Field of Classification Search
USPC .............. 455/414.1, 419, 466, 518–519, 436; 370/310.2, 328, 338, 331
See application file for complete search history.

(56) References Cited

U.S. PATENT DOCUMENTS

| | | | | |
|---|---|---|---|---|
| 7,272,392 | B2 * | 9/2007 | Boda | 455/432.1 |
| 7,280,516 | B1 * | 10/2007 | Costa et al. | 370/338 |
| 7,444,139 | B1 * | 10/2008 | Welch et al. | 455/416 |

(Continued)

FOREIGN PATENT DOCUMENTS

| | | |
|---|---|---|
| CN | 2914501 Y | 6/2007 |
| CN | 101513114 A | 8/2009 |

(Continued)

OTHER PUBLICATIONS

EPO, Communication Pursuant to Rules 161 and 163 EPC, Application No. 10809394.9, Mar. 30, 2012, 2 pgs.

(Continued)

*Primary Examiner* — Steve D Agosta
(74) *Attorney, Agent, or Firm* — The Danamraj Law Group, P.C.

(57) ABSTRACT

A network node, UE device and method for providing inter-device communications between wireless user equipment (UE) devices in a wireless communications network. Responsive to a request for call set-up and to a determination that the devices are local to each other, a band is allocated to the devices for inter-device communications. The call set-up function can be managed by a node in the wireless communications network, a network node outside of the wireless communications network or by a distributed function shared between a network node and an ad-hoc group of UE devices in a local area that are capable of inter-device communications.

17 Claims, 10 Drawing Sheets

(56) References Cited

U.S. PATENT DOCUMENTS

| | | | |
|---|---|---|---|
| 7,526,306 B2 * | 4/2009 | Brems et al. | 455/518 |
| 7,548,758 B2 | 6/2009 | Periyalwar et al. | |
| 7,689,167 B2 * | 3/2010 | Sengupta et al. | 455/41.2 |
| 7,912,039 B1 * | 3/2011 | Croak et al. | 370/352 |
| 7,944,896 B1 * | 5/2011 | Rawat et al. | 370/338 |
| 8,042,148 B2 * | 10/2011 | Andreasen et al. | 726/1 |
| 8,085,708 B2 * | 12/2011 | Bengtsson et al. | 370/328 |
| 2005/0232241 A1 * | 10/2005 | Wu et al. | 370/352 |
| 2006/0034200 A1 | 2/2006 | Matsumaru et al. | |
| 2006/0239267 A1 * | 10/2006 | Ryu | 370/392 |
| 2007/0226775 A1 | 9/2007 | Andreasen et al. | |
| 2007/0230423 A1 * | 10/2007 | Yoshida et al. | 370/338 |
| 2008/0002658 A1 | 1/2008 | Soliman | |
| 2008/0233990 A1 * | 9/2008 | Jen | 455/518 |
| 2009/0262668 A1 * | 10/2009 | Hemar et al. | 370/260 |
| 2009/0274090 A1 * | 11/2009 | Akhtar et al. | 370/328 |
| 2010/0144357 A1 * | 6/2010 | Chaudhri et al. | 455/450 |

FOREIGN PATENT DOCUMENTS

| | | |
|---|---|---|
| EP | 2472987 | 4/2012 |
| WO | 2006081123 A2 | 8/2006 |
| WO | 2011020180 | 2/2011 |

OTHER PUBLICATIONS

PCT, Search Report, Application No. PCT/CA2010/001259, Nov. 23, 2010, 5 pgs.

PCT, Written Opinion, Application No. PCT/CA2010/001259, Nov. 23, 2010, 6 pgs. .

PCT, International Preliminary Report on Patentability, Application No. PCT/CA2010/001259, Mar. 1, 2012, 7 pgs.

CIPO, Office Action, Application No. 2,771,457, Nov. 1, 2013, 2 pgs.

EPO, Extended European Search Report, Application No. 12161993. 6, Nov. 4, 2013, 7 pgs.

EPO, Extended European Search Report, Application No. 10809394. 9, Nov. 5, 2013, 7 pgs.

EPO, Communication Pursuant to Rules 70(2) and 70a(2) EPC, Application No. 10809394.9, Nov. 22, 2013, 1 pg.

EPO, Communication Pursuant to Rules 70(2) and 70a(2) EPC, Application No. 12161993.6, Dec. 9, 2013, 2 pgs.

* cited by examiner

SYSTEM AND METHOD FOR MOBILE NETWORK INTER-DEVICE COMMUNICATIONS

PRIORITY

This non-provisional patent application claims priority based upon the following prior U.S. provisional patent application: "MOBILE NETWORK INTER-DEVICE COMMUNICATIONS" Application No. 61/235,916, filed Aug. 21, 2009, in the name(s) of David Steer and Robert Novak; which is hereby incorporated by reference.

FIELD OF THE DISCLOSURE

The present patent disclosure generally relates to managing calls in wireless communications networks. More particularly, and not by way of any limitation, the present patent disclosure is directed to a system and method for assigning and managing the allocation of channels for use in direct communications between user equipment (UE) devices.

BACKGROUND

The use of mobile telephones and other wireless communication devices has increased tremendously in recent years. As the usage increases, it becomes increasingly necessary to utilize the available resources, such as bandwidth, in the most efficient manner.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
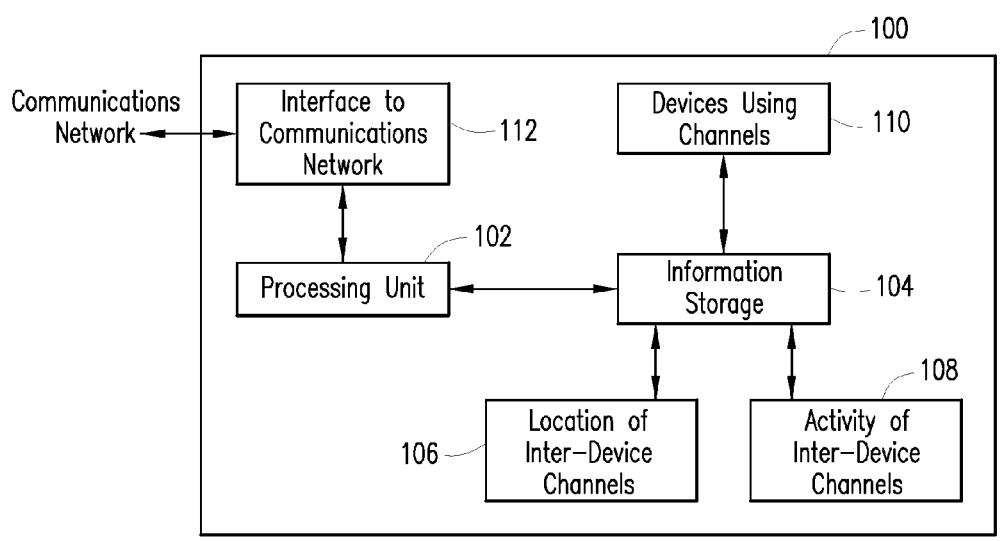
FIG. 1 depicts a block diagram of a network node providing Call Set-Up Functionality (CSUF) according to an embodiment of the present disclosure.

The current design of the major wireless communication systems is similar to the design of a fixed or wired telephone system in that all communication between two user equipment (UE) devices is switched through a centralized point in the network. Additionally, resources for a call within the network are allocated to each UE device as needed, i.e., connection to a switching point for a wired UE device and a radio channel and a connection to the core network for a wireless UE device. While this design is efficient for the overall system, a number of situations exist in a wireless communication system in which a large portion of the communication is between devices that are relatively close together, such as within an enterprise, a mall or an outdoor festival. Within these smaller environments, requiring all communication to be sent via the network can be an inefficient use of radio resources. An example of an inefficient use is described with reference to FIG. 2A, which is mentioned here briefly, but is discussed in greater detail below. In a conventional mobile communications network, when wireless UE device 220C is engaged in a voice call with wireless UE device 220D, it is well known that the voice communications from UE device 220C to UE device 220D is routed via access channel 222 to base station 202C associated with UE device 220C, then through base station controller 206 to core network 208, where the communication would be routed back through base station controller 206 to base station 202C, which is also associated with UE device 220D and then over access channel 224 to UE device 220D. Thus, the local traffic between these two wireless UE devices that are physically close together consumes two radio access channels and requires the transmission of the information across distances that can be considerably greater than the distance between the UE devices. In some network configurations, local traffic may be switched locally, e.g. at base station 202C or at base station controller 206, but typically all traffic will be routed to core network 208 where routers will redirect the traffic to the appropriate terminating base station controller and base station. Thus, even in the best-case scenario of local traffic switching, two radio access channels have been required to support communications between two UE devices that are in close proximity to each other. This inefficient use of the existing resources becomes more acute as greater numbers of mobile devices are deployed for an increasing number of uses. In this context the term "call" or "call-set-up" should be take to include all types of communication or session initiation between devices including, for example, voice calls, data communications, gaming, as well as video and image transfers.

Outside of the major mobile communications networks, some mobile communications networks have been designed to handle only local traffic, i.e., wireless device-to-wireless-device. Such networks are often characterized by a push-to-talk (PTT) configuration in which a local radio channel is shared among a number of user devices within range of each other. Each transmission is heard by all of the other devices within range using the same channel. While such configurations are simple and convenient, all of the users who wish to communicate must agree before hand on the same channel to use and there is no way to easily accommodate new devices or to communicate separately with individual devices. All parties using the channel hear all of the traffic. As devices do not have an individual address, they also cannot easily reach, or be reached by, other devices that are outside their network community. Devices that move outside the range of the communications channel or their neighbors become unreachable. In practical terms, these systems also require that each device's receiver be on at all times to be ready to receive traffic and hence they require a more bulky battery than the conventional network mobile devices. It is also inconvenient that these terminals are not compatible with the conventional mobile networks and so the users must carry two devices with them to be reachable beyond the range of their channel facility.

Some mobile communications networks, e.g., the Integrated Digital Enhanced Network (iDen), integrate different service classes to provide both half-duplex and full-duplex communications. Half-duplex communications, in which one user is transmitting or talking and other users are listening, is used for messaging, paging and push-to-talk voice communications. Full-duplex communications, in which an open, bi-directional link allows full two-way communication, is used for traditional telephone conversations and more intensive data links. However these systems, like conventional cellular networks, route all traffic, including local intra-cell communications and device-to-device traffic through a central server. Traffic between nearby wireless UE devices requires two radio channels.

Generally, wireless UE devices in conventional mobile communications networks are not configured to use radio communications channels to communicate directly between each other. Most common wireless communications networks use a technique of radio transmission known as frequency division duplexing (FDD) in which separate radio channels are used to communicate uplink, from the device to the base station, and downlink, from the network to the device. Other networks use time division duplexing (TDD) in which a single radio channel is used, with a first time slot used for uplink and a second time slot used for downlink communications. A UE device in these systems is thus not equipped to receive the transmissions from another device. In addition, the conventional mobile UE devices, while they are equipped to authenticate and provide security services, e.g. encryption, with the core network, they are not equipped to do authentication and security services with each other.

The disclosed embodiments provide a method, system and user equipment (UE) device for wireless communication systems that allows the UE devices to engage in inter-device communications. For the purposes of this patent application, inter-device communications is used to describe communications between two or more UE devices in which the UE devices communicate directly with each other over a channel that is allocated for inter-device use. A channel allocated for inter-device use may not be an exclusive allocation, and therefore, may also support other modes of communications. The network can oversee or mediate inter-device communications using control channels, as will be explained herein below, but the traffic, e.g. the voice or data communications, does not go through the network. The use of inter-device communications for communication between UE devices that are close to each other can provide improved efficiency in the use of radio resources, i.e. increased spectral efficiency, and reduced delay in the communications.

In order to enable inter-device communications within a wireless communication system, additional Call Set-up Functionality, referred to herein as CSUF, is added to the system. The CSUF of the disclosed inter-device communications can be implemented in a number of different embodiments in which the CSUF can be located within the mobile communications core network or within another network connected to the mobile communications network, such as an enterprise network or the Internet. In yet other embodiments, much of the functionality of the CSUF can be shared between an ad-hoc wireless group formed by inter-device-capable UE devices within a local area and a network node, which could include a base station or base station controller, that is less involved in call set-up than in the other embodiments. A number of these possible embodiments will be discussed.

When the CSUF is part of the core network structure, call initiation requests and routing of the calls between devices can be filtered based on parameters such as, for example, location, channel availability or interference conditions. Calls to wireless UE devices that are outside a local range of the calling device are routed to the called device using the conventional mobile communications facilities. Calls between inter-device-capable wireless UE devices that are within local range of each other are managed by the CSUF, which enables the set-up of a radio channel directly between the two wireless UE devices. When the CSUF is within a network that is attached to the core communications network, a UE device may send a request to the CSUF to request inter-device communications and the CSUF can either manage set-up inter-device communications or refer the UE device to the conventional communications network if inter-device communications is not feasible. When the CSUF is distributed between a mobile communications network and the local UE devices that are capable of inter-device communications, the ad-hoc wireless group formed by these UE devices determines whether the calling UE device and the called UE device are within range of each other and may assist in the establishment of private communications between two or more wireless UE devices that request inter-device communications. Whether the CSUF is embodied in the network or shared between the network and the UE devices, inter-device communications may include individual device-to-device links, as well as links among multiple devices.

Regardless of the location of the CSUF, the channels that are allocated for inter-device use can be selected to minimize interference with other usage in the area, including the control channel used to set-up the inter-device communications. In at least one embodiment, a separate band or bands within the network's bands can be designated for use in inter-device bands. Where appropriate, inter-device channels can be allocated in a radio access technology that uses a different standard than the UE device's home network, e.g., WLAN, IEEE 802.11, IEEE 802.16, GSM or CDMA, or on a channel that is allocated to another network operator. Usage of such channels can be subject to agreements between network operators or use an unlicensed band.

Referring now to the drawings, and more particularly to FIG. 1, an embodiment of a network node that provides call set-up functionality is disclosed. CSUF 100 includes processing unit 102 and information storage 104, which can include both cache memory as well as additional storage devices such as disk storage. Information storage 104 includes data structures in which the CSUF is able to store information used in managing the inter-device call set-up process. These data structures store information regarding channels that can be allocated to inter-device communications and the locations in which those inter-device channels may be used 106, the current activity on the inter-device channels 108 and the devices currently using the inter-device channels 110. Each of these data structures can include related information that is necessary to manage the use of the inter-device channels. For example, the capabilities of each of the UE devices currently operating on inter-device channels can be maintained in device data structure 110 to facilitate a transfer of management of the inter-device communication from a first base station to a second base station, i.e., when the UE devices are moving. A transfer from an inter-device channel to a regular channel may also become desirable if congestion, interference or distance between the UE devices increases. Additionally, CSUF 100 contains a module providing an interface to a communications network 112. The CSUF may make use of one or more of location, channel conditions, traffic or other information provided by the devices, the network or both devices and network to assist in making decisions to set up conventional or inter-device communications links. As will be discussed in greater detail below, CSUF 100 can be part of a wireless core network and thus connected directly thereto; CSUF may also be part of a network that is connected to but outside of the wireless communications network, e.g., an enterprise network or the Internet. These two embodiments operate in a similar, but not identical manner. An embodiment of each type of network connection will be discussed in connection with an explanation of the method of use in the respective embodiments. It will be understood that the elements of CSUF 100 form a network node operable to assign inter-device communications channels, with the network node containing a component configured to receive a call set-up request that designates a called wireless UE device from a calling wireless UE device, a component configured to determine whether inter-device communications is preferable between the calling wireless UE device and the called wireless UE device, and a component configured to send information for setting up inter-device communications to the calling wireless UE device and to the called wireless UE device when inter-device communications is preferable, wherein inter-device communications uses a radio channel operating directly between the calling and called wireless UE devices and uses at least one of a different band, a different radio access technology, and a different network than that used for obtaining the information for setting up inter-device communications.

Figure 2A:
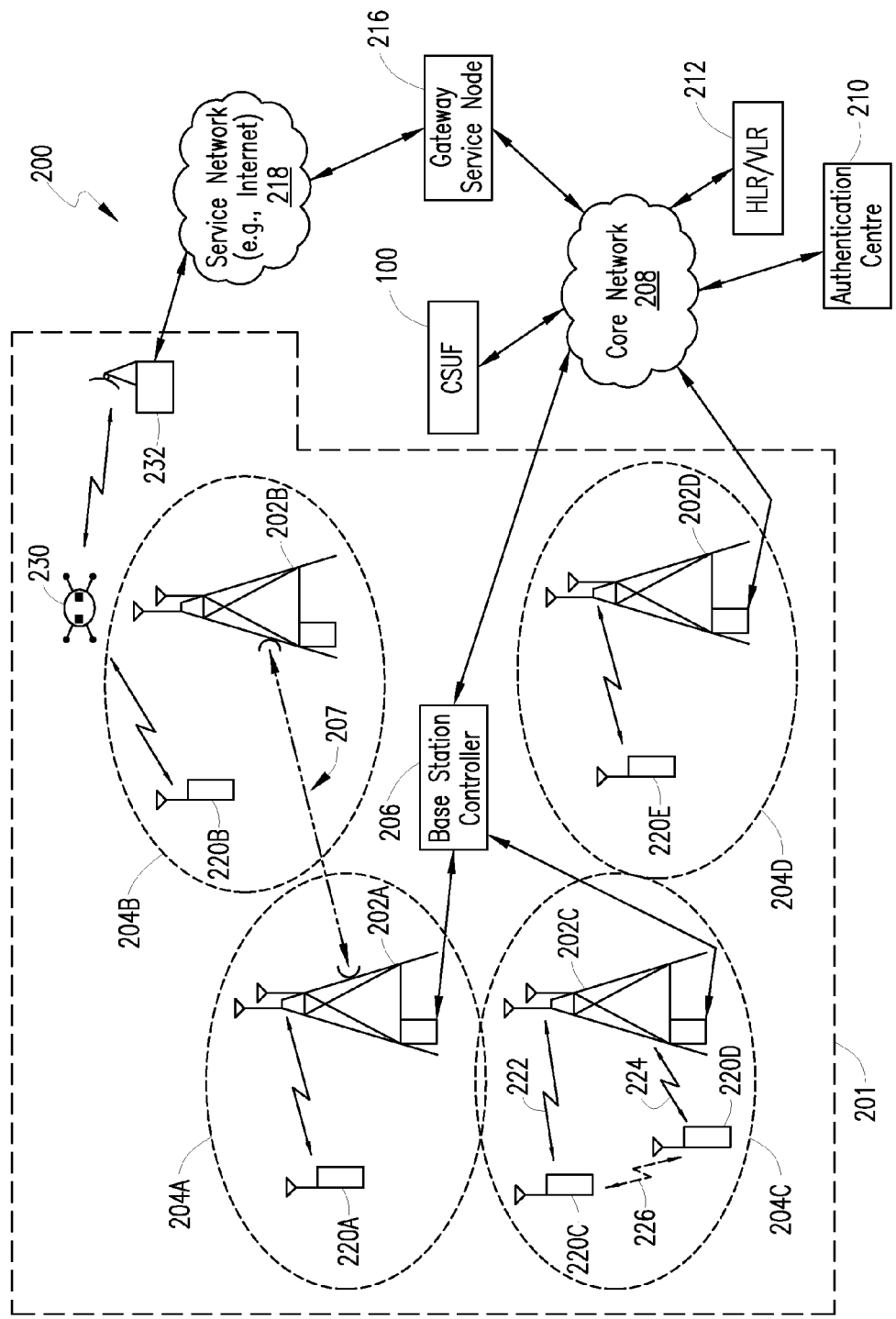
FIGS. 2A-2C depicts embodiments of a wireless network environment wherein the inter-device communication of the present disclosure may be practiced.
Figure 2B:
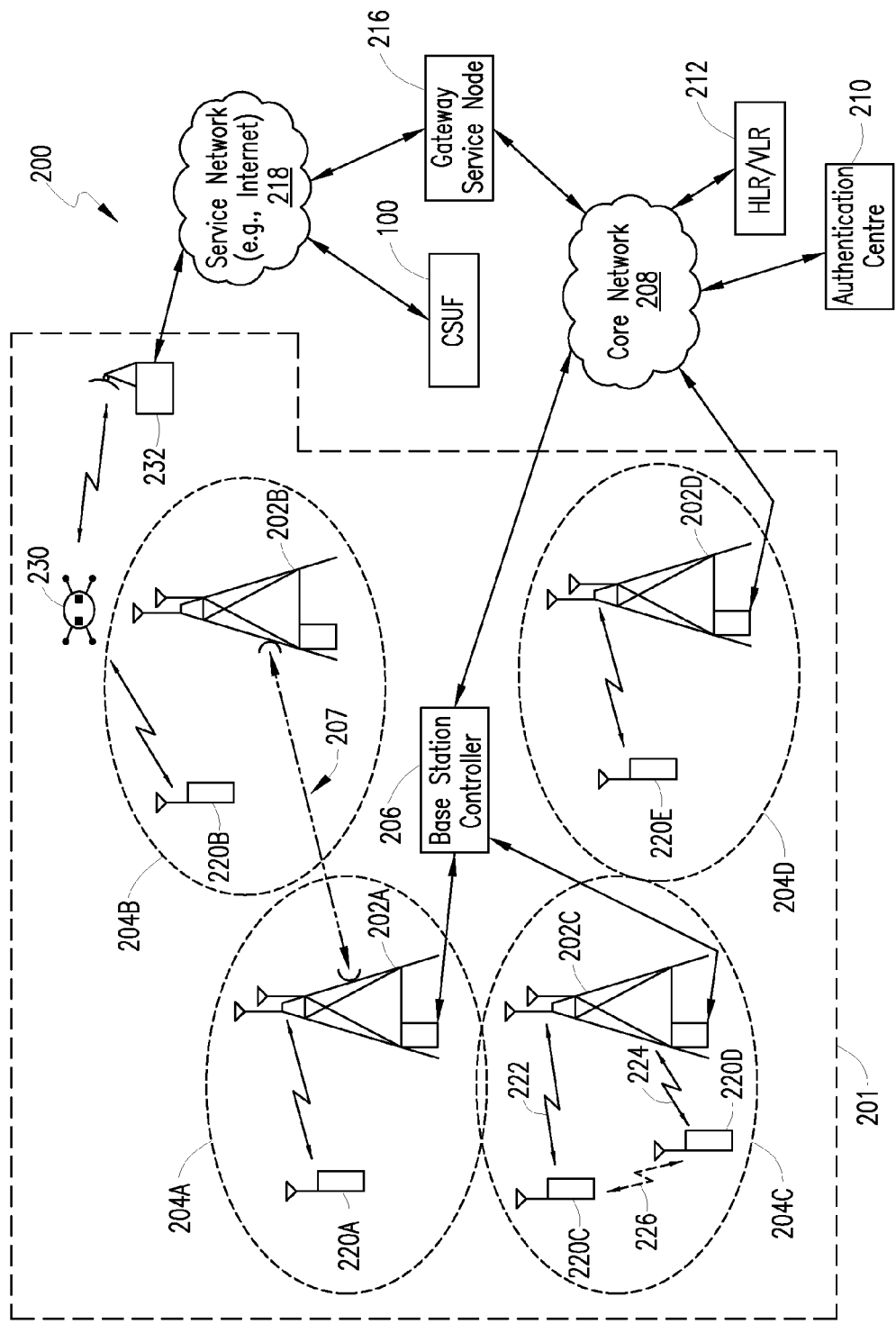

With reference now to FIGS. 2A-2B, embodiments of a system in which inter-device communication is enabled is disclosed. It can be noted that these embodiment differ primarily in the location of the CSUF within the system. Differences in the method used in these various embodiments will also be discussed. With reference first to FIG. 2A, a mobile communications network having an internal CSUF according to an embodiment of the disclosure is shown. The mobile communications network 200 includes a radio access network (RAN) 201 and a core network (CN) 208. RAN 201 includes a number of base stations 202, each base station providing wireless access to a respective service coverage region 204. Although not specifically shown, in some embodiments, RAN 201 can include other types of access points that include relays, femto-cells and pico-cells. Base stations 202 are connected to base station controller 206, with base station 202B being connected via a back-haul link 207 through base station 202A. Base station controller 206 provides a connection to core network 208, which includes authentication center 210 and home location register/visitor location register (HLR/VLR) 212. Gateway serving node 216 connects CN 208 to other networks 218 such as the Internet. Core network 208 may further be connected to the Public Switched Telephone Network (PSTN) and to other communications networks, neither of which are specifically shown. Within respective coverage regions 204, wireless UE devices 220 are configured to use control channels to carry on overhead operations with the communications network and to use data channels to communicate with other UE devices and with data services attached to the network, e.g. for voice communications, text messaging and browsing the Internet. In some cases UE devices 220 may communicate using satellite facilities. In this figure, UE device 220A is in communication with base station 202A and UE device 220B is in communication with the network using satellite 230 and associated satellite ground station 232, which are connected to core network 208 via the Internet 218. Additionally, UE devices 220C and 220D are in communication with base station 202C and UE device 220E is in communication with base station 202D.

For purposes of the present patent application, RAN 200 may be implemented in any combination of known or heretofore unknown radio access technology and network protocol. For instance, the RAN may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, etc. The RAN can also be an aggregation of channels from multiple bands in the radio access technology LTE-A (Long Term Evolution-Advanced). LTE-A is a set of enhancements to the Universal Mobile Telecommunication System (UMTS) that includes an all-IP networking architecture and the ability of each base station 206 to connect to multiple core networks (CNs).

The various elements shown in FIG. 2A can also be combined into common equipment or connected in different ways. Base station 202D in the illustration, for example, may be collocated with aspects of the base station controller 206. The LTE network architecture, for example, combines the elements of the base station and the base station controller into a single entity. There may also, for example, be multiple HLR/VLR, authentication centers and gateway serving nodes.

In the embodiment of FIG. 2A, CSUF 100 is incorporated into the structure of core network 208 and at least some of the UE devices 220 operating within RAN 201 have the capability of inter-device communications, e.g., as illustrated by channel 226 in FIG. 2A between devices 220C and 220D. CSUF 100 can be integrated with the call routing, call directing, or translation processing inherent in the communications network. In some communications networks and for some traffic, the call routing process is a part of the session initiation protocol (SIP). CSUF 100 may be associated with many of the devices in the communications network (i.e. co-located) or it may be a distributed function that is provided by devices at many places in the network. While this discussion illustrates the CSUF as a single entity, to preserve scaling in a large network, the CSUF can be implemented as multiple instances of the CSUF located throughout the core network with each instance handling traffic for a nearby region of mobile network facilities and coverage cells.

Figure 3:
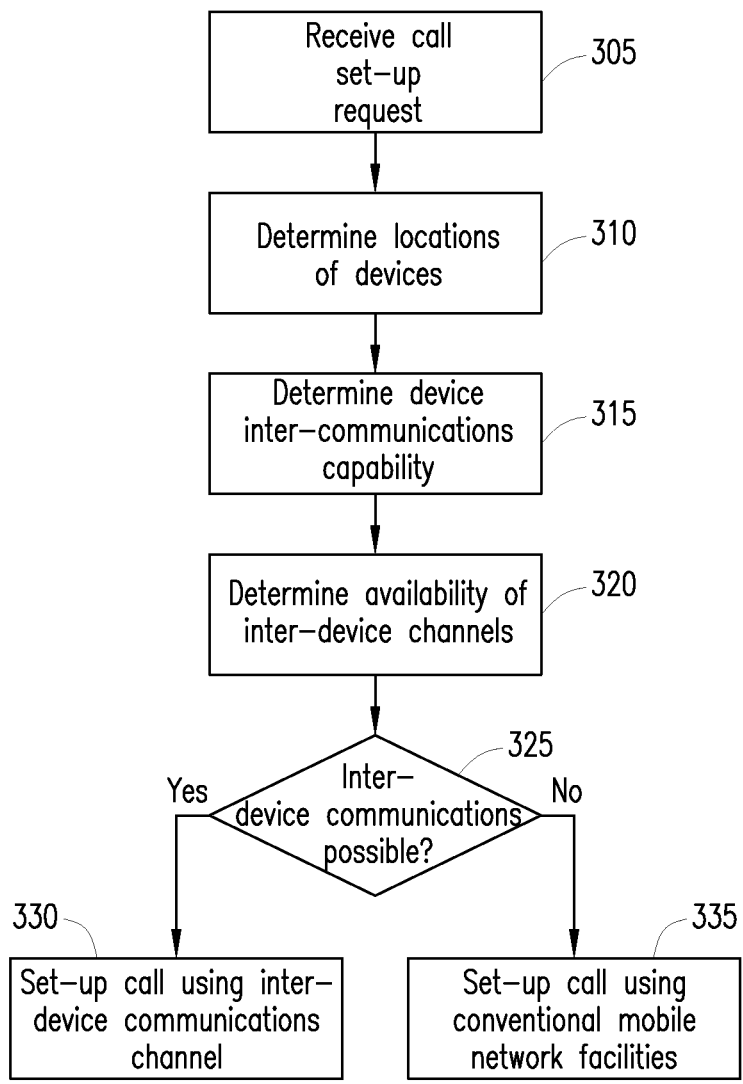
FIG. 3 depicts a flowchart of inter-device call set-up when the CSUF is part of a wireless communications network according to an embodiment of the present disclosure.

With reference now to FIG. 3, an embodiment is shown of a method to perform call set-up at a CSUF that is integrated into a core network of a communications network, e.g., the communications network of FIG. 2A. In element 305, the CSUF receives a call set-up request from a UE device, e.g., UE device 220C, to initiate a call to another UE device, e.g. UE device 220D. Since the CSUF is a part of the core network, all call set-up messages can be routinely examined by CSUF 100 to determine whether inter-device communications is possible and desirable. To accomplish this filtering, the CSUF determines the locations of both the calling UE device and the called UE device at element 310. The CSUF also determines whether both UE devices have the capability to engage in inter-device communications at element 315. Finally at element 320, the CSUF determines the availability of inter-device channels, where availability may include interference conditions, use by other devices or apparatus, and that channels have been allocated for inter-device use. Using the collected information, the CSUF determines whether inter-device communication is possible and desirable at element 325. If both of the devices are capable of inter-device communications, are within range of each other for inter-device communication and inter-device channels are available, the CSUF sets up the call to use an inter-device channel at element 330. In the embodiment of FIG. 2A, UE devices 220C and 220D are thus able to communicate via direct link 226, rather than each requiring respective data channels 222, 224 via the base station. If inter-device communications is not possible, the call is set-up using conventional mobile network facilities at element 335.

It will be clear to one skilled in the art that although the flowchart of FIG. 3 depicts that elements 310-320 are performed in a specific order, these determinations can be made in any order. Similarly, the decision made at element 325 does not necessarily occur after all of the prior determinations are made in elements 310-320, as these elements can be combined in various ways. For example, the CSUF may initially determine whether both UE devices are capable of inter-device communications. If the answer is 'no', there is no need to determine the locations of these UE devices relative to each other or to determine the availability of inter-device channels. Accordingly, the CSUF would proceed to element 335 to set-up the call conventionally without performing these other elements.

The information to make the determinations of FIG. 3 can be obtained from either the UE devices themselves or from available network resources. In at least some embodiments, the call set-up request message from the calling UE device includes information about the calling UE device, such as the UE device's address, the UE device's ability to provide inter-device communications, the location of the UE device as determined by GPS, local channel conditions, etc., as well as identifying the called UE device. In an embodiment in which the location of the calling UE device is not provided to the CSUF, the CSUF may use information gathered from the network, such as the base station being used and the sector of the coverage area in which the calling UE device is located, capability information received from the home location register, etc. In at least some embodiments, the determination of the capabilities and location for the called UE device involves the CSUF sending an inquiry to the called UE device to ascertain the called device's current location and ability to engage in inter-device communications. In other embodiments, the CSUF determines this information from other nodes in the communications network, as with the calling device. The CSUF may also inquire of one or both devices as to their communications environment to help ascertain, for example, those channels having the least interference for inter-device communications. All of this collected information can be used by the CSUF to determine whether inter-device communications is appropriate, i.e., is a possible and desirable option for the network, the UE devices or both.

In some embodiments, if the CSUF determines that inter-device communication is appropriate, the CSUF will provide a channel assignment and authentication or security credentials to both the calling UE device and the called UE device. This could be, for example, session identifiers or session keys used to encrypt the radio communications. Only the two devices would receive the identification or keys for the session and so the devices are able to authenticate each other and the communications channel would be secure. The CSUF will designate one UE device, e.g., the calling device, to transmit signals on the assigned channel to initiate radio link establishment. The other UE device, e.g., the called device, will be instructed to listen on the designated channel. During the time in which the two UE devices are using the inter-device channel, one or both of the devices continue to monitor communications from the network and to pass information to the network as appropriate. When the UE devices complete their communication, the UE devices notify the CSUF that the call has been completed so that the inter-device channel is immediately available for use again by other devices.

It is notable that in the embodiment of FIG. 2A, UE devices 220C and 220D are both shown within coverage area 204 of base station 202C and both receive instructions for communications via the same base station. This is not a requirement for inter-device communications. For example, the UE devices may be in the coverage areas of adjacent base stations, i.e., UE device 220C could be in communication with base station 202C while UE device 220D is in communication with base station 202D. Also, either or both of UE devices 220C and 220D could be in communications with the network using a communications satellite and its associated ground station, a relay station, a pico-cell, etc. In at least one embodiment called UE device 220D is operating an adjacent but competing communications network to core network 208. In this embodiment, each of UE devices 220C and 220D continue to monitor respective control channels while conducting their inter-device communications. Additionally, the example shown in this figure includes only two devices engaged in the communication, although this is also not a limitation. More than two UE devices can utilize an inter-device channel and provide multi-party communications. In this case each device would receive all signals sent over the inter-device channel and would transmit its contribution when allowed on the inter-device channel. The supervision of the use of the inter-device channel in multi-party mode would be coordinated though local device management signaling. For example, the UE devices may use the protocol of the IEEE 802.11 radio access technology to facilitate communications among multiple devices.

When assigning inter-device channels for local communications, the CSUF may take into consideration the range separation and channel conditions available locally at the UE devices, as well as the bands that are available for inter-device use. If they are available, channels within a high frequency band, e.g. 2.4 GHz, 3.5 GHz or 5 GHz, can be assigned to devices that are close together, e.g. within 20-100 meters of each other. If they are available, channels within a low frequency band, e.g. 700 or 800 MHz, may be assigned to devices that are separated by longer distances, e.g., up to about a kilometer.

As described up to this point, the CSUF is implemented as a process that is integral to the signaling and call set-up facilities of the mobile communications network. As such, the mobile UE devices request call set-up using the mobile network's signaling facilities and receive instructions over the network's signaling facilities in the same way that other calls are requested and set-up. Channels are allocated for inter-device communications in a dynamic manner in response to each request. Alternatively, the inter-device capable wireless UE devices can be granted access to specific channels that are reserved for inter-device communications, which may operate using reserved resources including forms of carrier sense multiple access. To support this implementation, many facilities in the mobile communications network would be upgraded to support the intra-cell calling facility and aspects of the communications protocol with wireless UE devices may need to be standardized.

In an alternate embodiment, illustrated in FIG. 2B, CSUF 100 is separate from the wireless communications network and is implemented as a process operating, e.g., on the Internet or within an enterprise network. In this embodiment, wireless UE devices that are capable of inter-device communications contact CSUF 100 using the network's communications facilities for signal exchange. CSUF 100 has an address that is known to the devices capable of using this capability. For example, the devices may use the communications facilities of the radio access network and the Internet to facilitate communications with the CSUF 100. This communications mode is sometimes called "over-the-top" (OtT) as it is at the applications layer of the communications hierarchy. Such over-the-top signaling may utilize, for example, the common Internet Protocols TCP/IP or forms of the Short Message Service (SMS).

Figure 4:
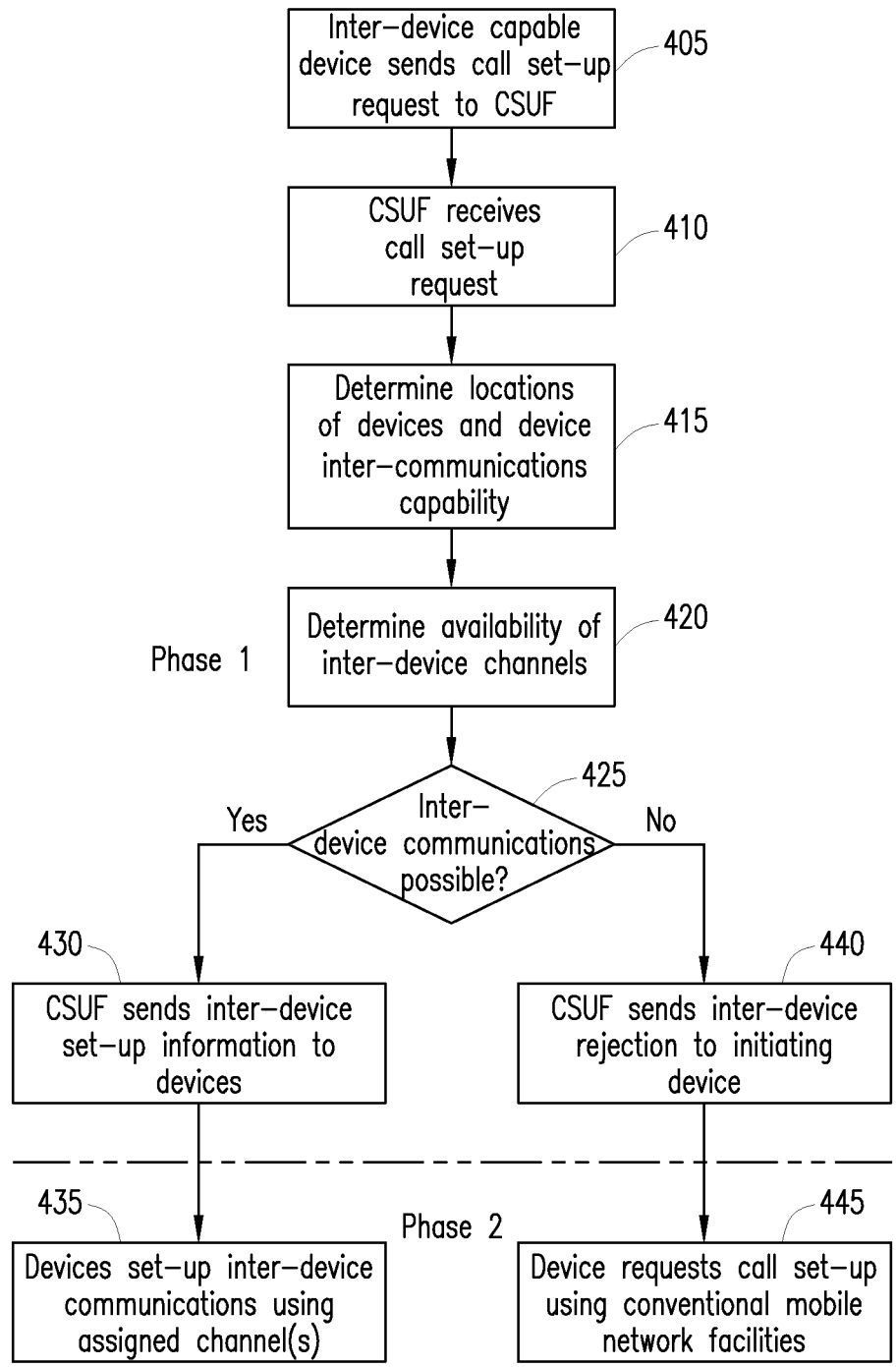
FIG. 4 depicts a flowchart of inter-device call set-up when the CSUF is outside of a wireless communications network according to an embodiment of the present disclosure.

In the embodiment of FIG. 2B, wireless UE devices that are capable of inter-device communications use a multi-phase process to initiate a call, as shown in FIG. 4. The first phase of this figure is similar to the process of FIG. 3 but in addition to the use of OtT communications, this method uses an extra element when inter-device communications is not possible. The user of a mobile UE device can initiate an inter-device call using an inter-device communications application on the mobile UE device. Alternatively, the inter-device communications application can be set as a default application for managing outgoing calls. Once invoked, the inter-device communications application sends a request for call set-up to the CSUF using OtT communications at element 405. The call set-up request is sent in a protocol known to the CSUF and contains information about the location of the calling UE device, information about channel conditions at the UE device and the identification of the called UE device. The CSUF receives the call set-up request at element 410. The CSUF will contact the called UE device, also using OtT communications, to inquire as to the location and inter-device communications capability of the called UE device at element 415. If the called UE device is capable of inter-device communications, a return message can also include local channel conditions for the called UE device. The CSUF will also determine the availability of inter-device channels in the location of the two UE devices at element 420. The CSUF is then able to make the determination whether inter-device communications is possible and desirable at element 425. If inter-device communications is not possible for the request, the CSUF returns an OtT message to the calling UE device indicating that the request for inter-device communications is rejected at element 440. In the subsequent phase, the calling UE device would then request a communications session using the communications network's signaling facilities and the two UE devices would be connected using the conventional facilities of the mobile communications network at element 455. If the CSUF determines that inter-device communications is possible, the CSUF would send OtT messages to both the calling UE device and the called UE device with necessary identification and security information for them to initiate and maintain their inter-device communications at element 430. This information can include an assigned inter-device communications channel and security credentials to establish mutual communications. The information can also include conditions under which the UE devices should cease inter-device communications and request handover, new channel(s), or further instructions from the mobile communications network or CSUF. Such conditions can include geographic locations for which the assigned inter-device channel is not valid, or conditions of interference that would require channel reassignment. The UE devices are then able to set-up inter-device communications at element 435 as previously described. This embodiment, with the CSUF outside of the mobile communications network, has the advantage that it can be implemented without modifications to the existing network, and without an immediate need to standardize the CSUF signaling protocols and messages within the major communications networks.

During communications between wireless UE devices using the inter-device communications channels, the UE devices can continue to maintain contact with their respective mobile communications network and associated services. This contact will be maintained by use of the mobile network's signaling channel and communications facilities. Accordingly, the UE devices are able, to the extent their capabilities permit, to initiate and receive additional calls and to exchange signaling messages with the network signaling facility and the CSUF. When the two (or more) UE devices are finished with their use of the inter-device communications channel, the UE devices would end their operations on the channel and signal to the CSUF using OtT signaling to indicate that they are no longer using the local inter-device channel. The CSUF may then allocate the inter-device channel resources for another service or communications for other local devices.

As the wireless UE devices using an inter-device channel change location, a handover can become necessary or desirable for a number of reasons. A handover can be necessary to change the mobile network channel from one base station or cell to another. It is not necessary that all participating mobile devices undergo handover at the same time because inter-device communications may occur while devices are in the geographic area of multiple cells, while the resources designated for inter-device communications do not necessarily correspond exactly to the coverage regions for base stations of the mobile communications network. These handovers of UE devices from cell to cell follow the mobile communications network protocols and will typically be independent of the handover of the use of the inter-device channels. For example, the UE devices using an inter-device channel can be moving together in separate vehicles and require a mobile network cell handover, but not an inter-device channel handover. However, the devices may use the occurrence of a main network handover to consider the need for and, if necessary, initiate a handover of inter-device channel. This can be necessary if the current inter-device channel is not available for use in the new location of one or more of the devices.

Another cause of handovers during inter-device communications concerns the channel conditions, such as interference, around the UE devices. While engaged in inter-device communications, the mobile UE devices can monitor the channel performance and their relation to the channels of the mobile network. In cases where one or both of the wireless UE devices is moving, the channel conditions can change and this change can necessitate a handover of the active services to either a more suitable inter-device channel or to communications over conventional mobile network communications channels. Conditions that lead to handover may also include moving into geographic locations where the inter-device communications channel assignment is no longer appropriate for regulatory or other reasons or the wireless UE devices are approaching the limit of the range of the inter-device communications channels.

Figure 5A:
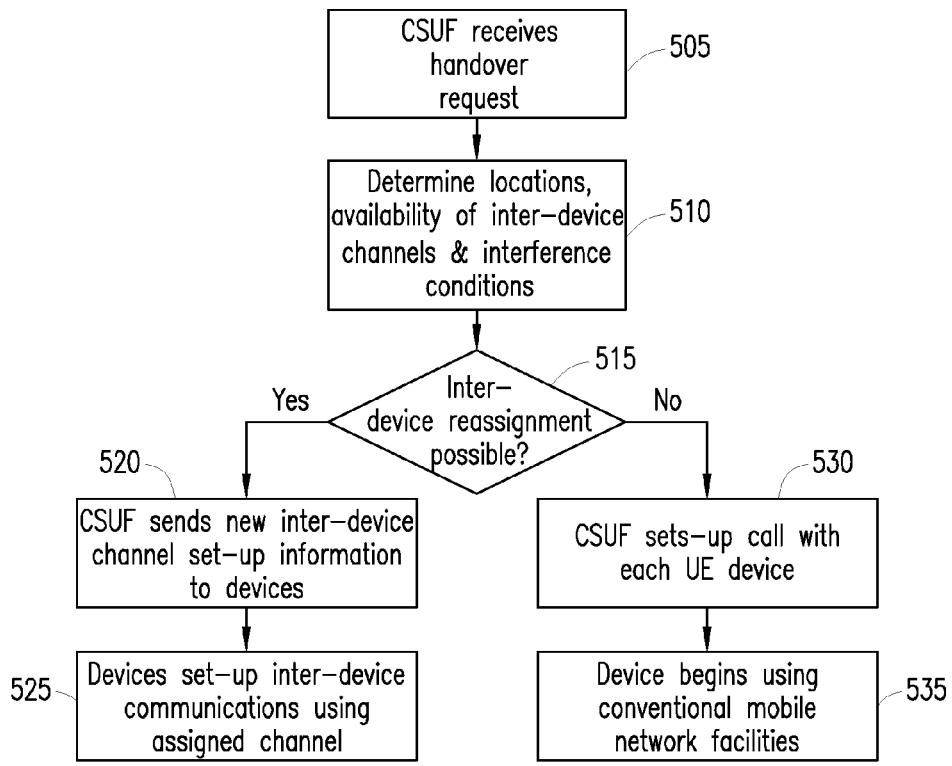
FIGS. 5A-5B depicts flowcharts of a handover of inter-device communications for wireless UE devices according to embodiments of the present disclosure.

When these conditions occur, the devices may initiate a handover of the inter-device communications to another, more suitable, channel. This handover can take a number of forms, depending on the particular implementation. Referring again to FIG. 2A, the CSUF in this embodiment is integral to the mobile communications network and utilizes the signaling capabilities of the communications network. A request for handover in this environment is shown in FIG. 5A. At element 505, the CSUF receives a handover request from a UE device indicating a need for a change from the currently used channel. The CSUF considers the respective locations of each of the UE devices and determines the availability of any channels, where availability may include interference conditions, use by other devices or apparatus, and whether available channels have been allocated for inter-device use at element 510 and at element 515 determines whether reassignment to a more suitable inter-device channel is possible. If a more suitable inter-device channel is available, the CSUF sends the new inter-device channel set-up information to both of the UE devices at element 520 and the UE devices are able to set-up on the new channel and continue communications at element 525. If the wireless UE devices have moved farther apart, a new channel can be assigned in a frequency band that has longer range propagation characteristics. If no other suitable inter-device channels are available, the CSUF is able to set-up the call on conventional channels with each UE device at element 530 and the UE devices begin using the conventional mobile network facilities. As the inter-device communications channels and the network channels may have different capabilities this handover may involve some change in service quality for the devices.

Figure 5B:
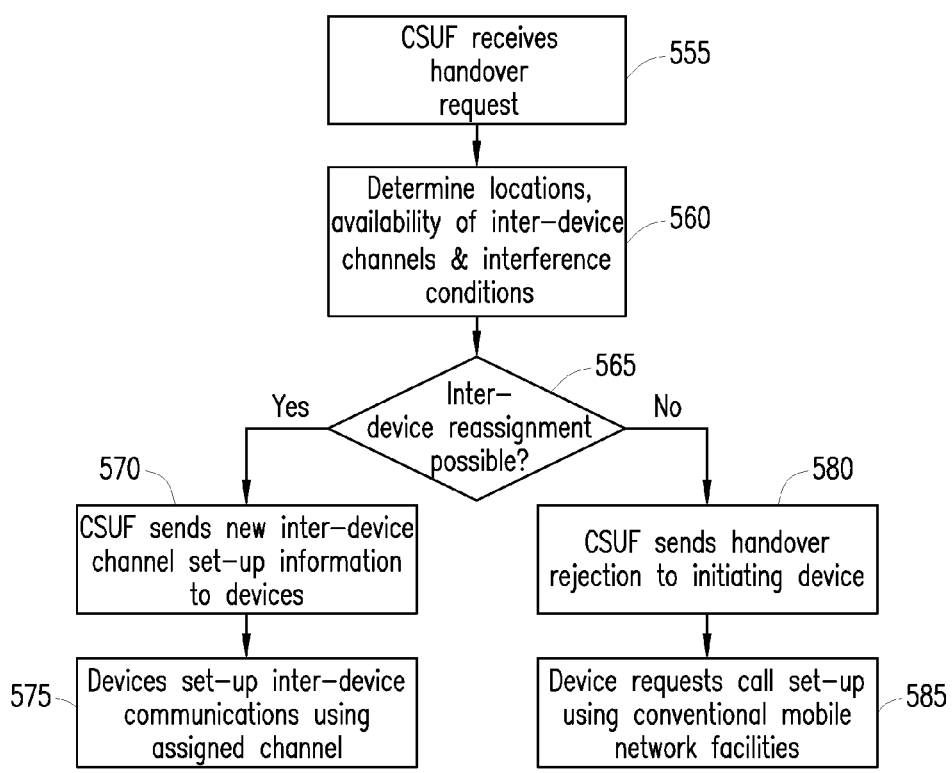

When the CSUF is outside of the mobile communications network, as shown in FIG. 2B, the managing of a handover request is similar, but not identical, as demonstrated in FIG. 5B. At element 555, the CSUF receives a handover request from a wireless UE device that is engaged in inter-device communications. The CSUF considers the respective locations of each of the UE devices and determines the availability of any channels, where availability may include interference conditions, use by other devices or apparatus, and whether available channels have been allocated for inter-device use at element 560. The CSUF is then able to determine whether reassignment to another inter-device channel is possible at element 565. If reassignment is possible, the CSUF sends new inter-device channel set-up information to the UE devices at element 570 and the UE devices set-up their communications on the new inter-device channel at element 575. If reassignment is not possible, the CSUF sends a handover rejection to the initiating UE device at element 580. The initiating UE device would then make a call set-up request to the mobile communications network for conventional communications between the wireless UE devices at element 585. Once the new network connection was established, the devices would resume service on the new channel.

In some cases and implementations, the CSUF may also initiate the handover to another cell or other inter-device channel based on various conditions of load balancing, channel availability, tracking of one or more of the device's movements into or out of a given geographic region, interference mitigation, or regulatory requirements. The CSUF receives the relevant information from the wireless UE devices regarding channel conditions and locations, and when appropriate, determines availability and suitability of new inter-device channels and sends the handover instructions to the devices.

In the implementation described up to this point, the inter-device channels and their use for communications among UE devices is directly supervised by the CSUF in either the mobile communications network or the larger network. The CSUF manages and tracks assignment of the inter-device channels and the CSUF is able to identify those UE devices that are located within range of each other for the use the inter-device channel communications to be appropriate. In these implementations the CSUF can also provide the function of administering the inter-device communications channels to minimize interference between various uses of the channels, i.e., UE-device-to-UE-device communications, conventional mobile communications and other device-to-device communications. This management may include determining interference, device location information and handover requests from devices as well as management directed by the CSUF itself.

In some implementations where the CSUF node is a separate entity from the mobile communications network, e.g., part of the Internet, the management of traffic may include coordination with the mobile communications network. This implementation may be considered in cases where the UE-device-to-UE-device inter-communications and mobile communications network traffic use the same channel set. Management of the device-to-device communications is supervised by functions of the CSUF, however in some implementations, interaction and negotiation may occur between the CSUF and the mobile communications networks to ensure channel management across multiple devices and services.

In some cases, one or more of the UE devices involved in an inter-device communications link move to an area where it can no longer reliably connect with the mobile communications network. The inter-device connection may be allowed to continue as long as at least one device is able to connect to the CSUF for oversight and management. In this case, the inter-device communications link is supervised by the CSUF and necessary information about the mobile device(s) that cannot connect to the CSUF directly may be routed through devices that are in contact with the CSUF.

Hence, the CSUF is in contact at least by proxy to all devices using the inter-device communications channel. If all mobile devices using a given inter-device communications link cannot connect to the mobile communications network, the usage may be allowed to continue provided another mobile device in the area can provide information to the CSUF about the activity of the inter-device communications link. These observation reports from other devices permit continued supervision of inter-device link usage. In the event that all devices using an inter-device communications link are unable to connect to the mobile communications network and therefore to the CSUF, the UE devices may terminate the inter-device communications channel, if required for regulatory reasons, after a timeout interval has expired.

In at least some embodiments of inter-device communications, the network is not closely involved in controlling the use of an inter-device channel. In these embodiments, the call set-up function (CSUF) is distributed among nodes of the communications network and a group of wireless UE devices that are capable of inter-device communications. The network portion of the CSUF enables the broadcast in each cell, e.g., using the broadcast signaling facilities of the mobile communications network, of information advertising the availability of an inter-device communications channel. In some cases this information may also include some instructions for the use of the channel, e.g., an access method used on the inter-device channel(s) and the method(s) available for contacting another specific UE device. UE devices within the cell that are capable of inter-device communications can then tune to the broadcast channel to become informed of the availability of the inter-device channel. UE devices may then form an ad-hoc group with other wireless UE devices using the inter-device channel. The ad-hoc group can share information regarding the wireless UE devices tuned to the inter-device channel and can assist a calling UE device in locating and setting up a connection with a called UE device, thus providing the terminating end of the call set-up function.

Figure 2C:
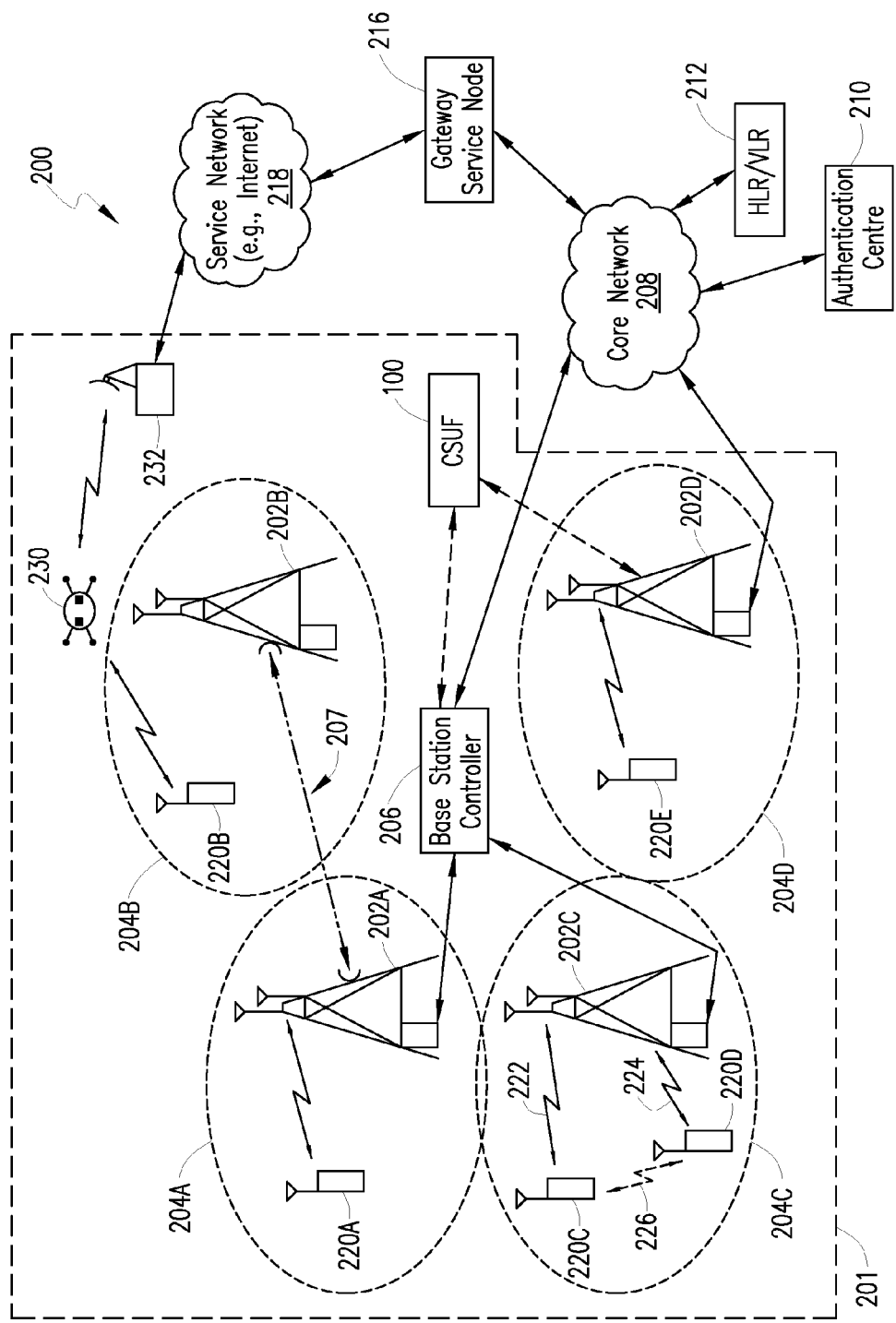

In at least one embodiment, the UE devices on the inter-device channel can utilize packet-based carrier sense multiple access to share the channel, i.e. each device determines whether the channel is busy before attempting to send packets. In other embodiments, the UE devices on the inter-device channel can use time division multiplexing (TDMA), code division multiplexing (CDMA) or other multiplexing systems to share the channel. In these embodiments, the broadcast information can provide the coding or timing used for communications by local ad-hoc group on the inter-device channel, while UE devices in the ad-hoc group may collectively assist negotiations to determine the coding or timing for connections between two or more specific UE devices to provide private conversations. Because much of the functionality of the CSUF in this embodiment is embodied in the UE devices, the network portion of the CSUF has little need of the information stored in the core network; accordingly, the network portion of the CSUF can be provided at a location within the radio access network (RAN), e.g. at a base station or base station controller, as shown in FIG. 2C.

Figure 6:
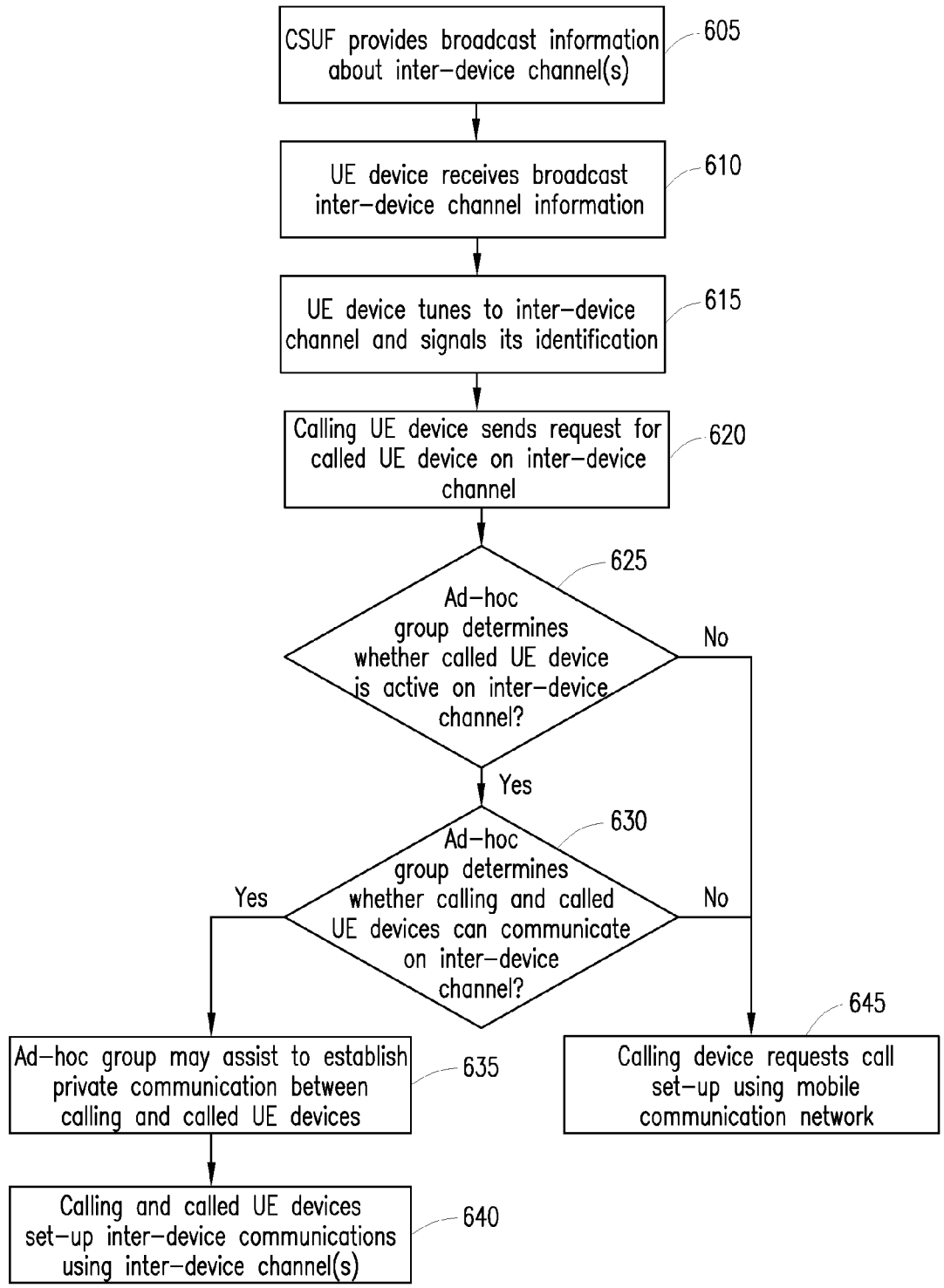
FIG. 6 depicts a flowchart of inter-device call set-up in one embodiment of an ad-hoc group of wireless UE devices according to an embodiment of the present disclosure.

With reference now to FIG. 6, a method for providing inter-device communications in connection with an ad-hoc wireless UE group using an inter-device channel is shown. In this embodiment, the only input provided by the network portion of the CSUF is the initial broadcast regarding the availability of at least one inter-device channel. At element 605, the network broadcasts information from the CSUF about the inter-device channel, including instructions that a UE device may use to send a page message to indicate an interest in contacting a specific neighboring UE device on the inter-device channel. In an alternate embodiment the UE device is already aware of the paging or other protocol for inter-device communications in this manner, such that the broadcast information from the CSUF includes information about the inter-devices channels, and information related to the configuration of the paging or other protocol in use by the network at that time. In at least one embodiment, the use of this paging capability is allowed at specific, but infrequent intervals for inter-device paging so that the listening window of a device for a potential page is relatively short and infrequent to preserve battery life and processing resources for other functions. This process has the advantage of enabling inter-device communications between any two UE devices within the local area that are capable of this type of communications without the need for each device to interact with the CSUF or to monitor the inter-device channel for signaling other than at known times when a distributed connection can be established. When an inter-device communications application is active on a UE device, the UE device receives the information regarding an available inter-device channel at element 610. The wireless UE device then tunes to the received inter-device channel and signals its identification to the other UE devices in the area at element 615. As new devices enter or leave the area, the ad-hoc group is able to maintain a dynamic network in which inter-device-capable UE devices are aware of each other. To initiate a call, the calling UE device sends a request for connection to the called party on the inter-device channel at element 620 and the ad-hoc group may assist in determining whether the called UE device is on the inter-device channel at element 625. If the called device is currently listening on the inter-device channel, the called UE device can respond to the request directly and ad-hoc-group assistance may not be required. In some situations, the called UE device can be out of direct range of the calling UE device, e.g., a physical barrier prevents a direct connection, but in range of other UE devices on the same inter-device channel. In this situation, intermediate UE devices can provide a forwarding service to enable communications between the calling and called UE devices. If a determination is made that the called UE device is not currently on the inter-device channel, the calling UE device can request the call using the conventional mobile network infrastructure at element 645. If the called UE device is on the inter-device channel, the ad-hoc group is then able to determine whether the calling and called UE devices are able to establish inter-device communications, either with or without intermediate UE devices providing forwarding, at element 630. Depending on the specific design of the inter-device communications applications within the ad hoc group, e.g., the willingness of intermediate UE devices to provide forwarding, the desired communications may or may not be possible. If it is determined that the desired communications can be established, then if necessary, the ad hoc group may assist the calling and called UE devices in establishing private communications between the two UE devices at element 635 and the calling and called UE devices initiate their communications session at 640. If it is determined that the inter-device communications cannot be established, the calling UE device may request call set-up using the conventional mobile network infrastructure at element 645.

Figure 7:
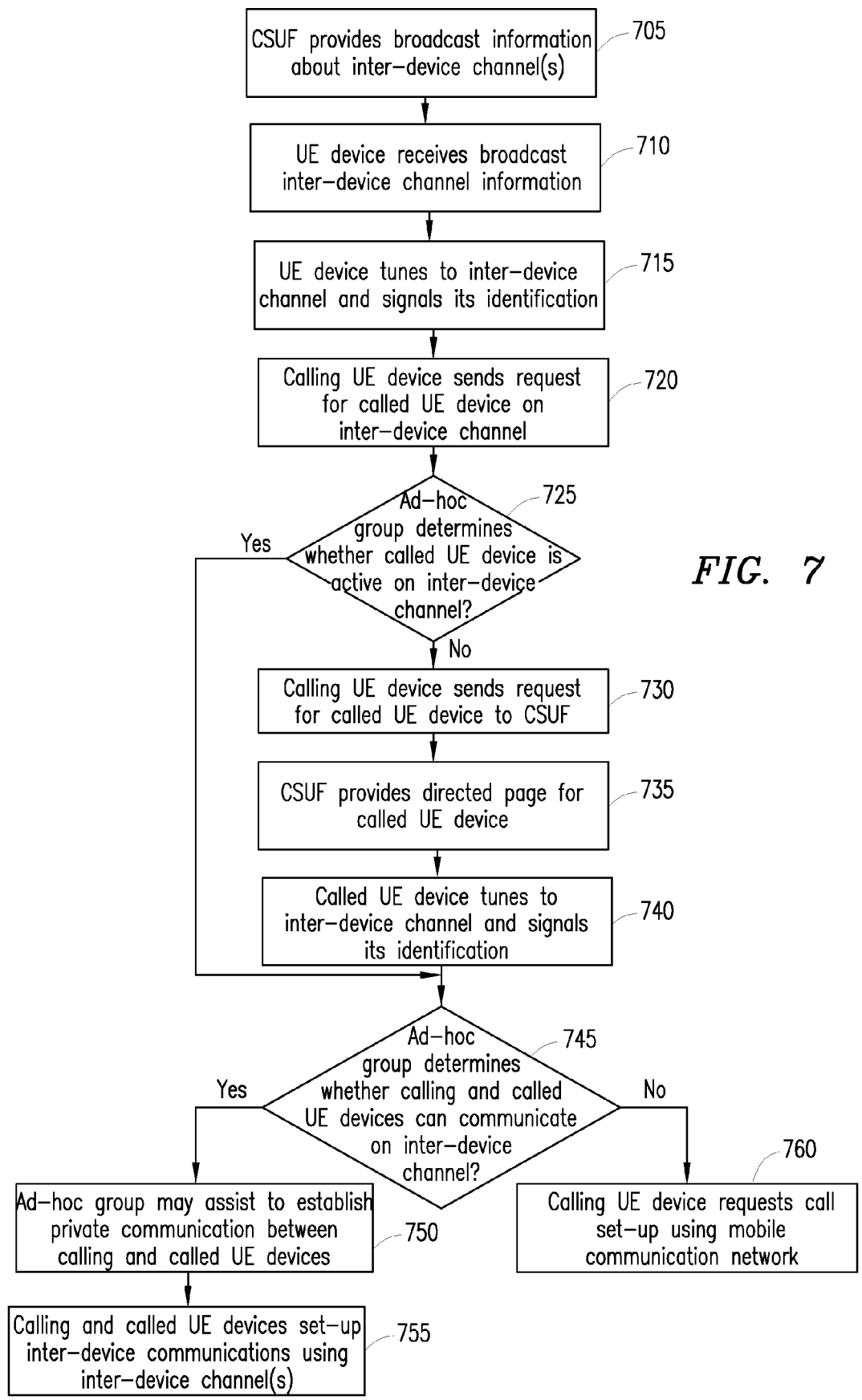
FIG. 7 depicts a flowchart of inter-device call set-up in one embodiment of an ad-hoc group of wireless UE devices according to an embodiment of the present disclosure.

In some embodiments using an ad-hoc group and inter-device channels, the network portion of the CSUF can provide additional assistance to UE devices, such as providing network paging of other UE devices. Such an embodiment will be discussed with reference to FIG. 7. At element 705, the network provides broadcast information about one or more inter-device channel, including information that the CSUF can perform paging for inter-device communications. A UE device that is operable in an inter-device communications application receives the information regarding an available inter-device channel at element 710. The wireless UE device then tunes to the inter-device channel and signals its identification to the other UE devices in the area at element 715 as discussed previously. A calling UE device sends a request for connection to the called party using the inter-device channel at 720 and determines whether the called UE device is on the inter-device channel at element 725. In some implementations, listening for this inter-device page may be limited to cases where a mobile device does not have a connection with the CSUF. If the called device is on the inter-device channel, the flow goes to element 745 for determination whether an inter-device connection is possible. If a determination is made that the called UE device is not currently on the inter-device channel, the calling UE device sends a request for the called UE device to the CSUF at element 730 and the CSUF may provide a directed page to the called UE device using the mobile communications network and informing the called UE device of the desired communications at 735. The called UE device may tune to the inter-device channel, signal its identification to the ad-hoc group and listen for a call at element 740. Other UE devices that are capable of inter-device communications would also tune to the inter-device channel upon hearing the page and those that can provide a linkage, which may be multi-hop, between the calling UE device and the called UE device would coordinate to handle traffic between the two UE devices. The ad-hoc group is then able to determine whether the calling and called UE devices are able to establish inter-device communications, either with or without intermediate UE devices providing forwarding, at element 745. Depending again on the specific design of the inter-device communications applications within the ad hoc group, the desired communications may or may not be possible. If it is determined that the desired communications can be established, the ad-hoc group may assist the calling and called UE devices to establish their private communications to take place at element 750 and the calling and called UE devices set-up their inter-device communications at element 755. If it is determined that the inter-device communications cannot be established, e.g., either because the called UE device does not answer the page or an inter-device communications is not practical for other reasons, the calling UE device may request the call set-up using the conventional mobile network infrastructure at element 760. In some at least one embodiment illustrated by FIG. 7, the ad-hoc group of devices consists of calling and called devices only, and hence the determinations at 725 and 745 may be limited to the ability of the called and calling devices to communicate directly using the inter-device channel.

Figure 8:
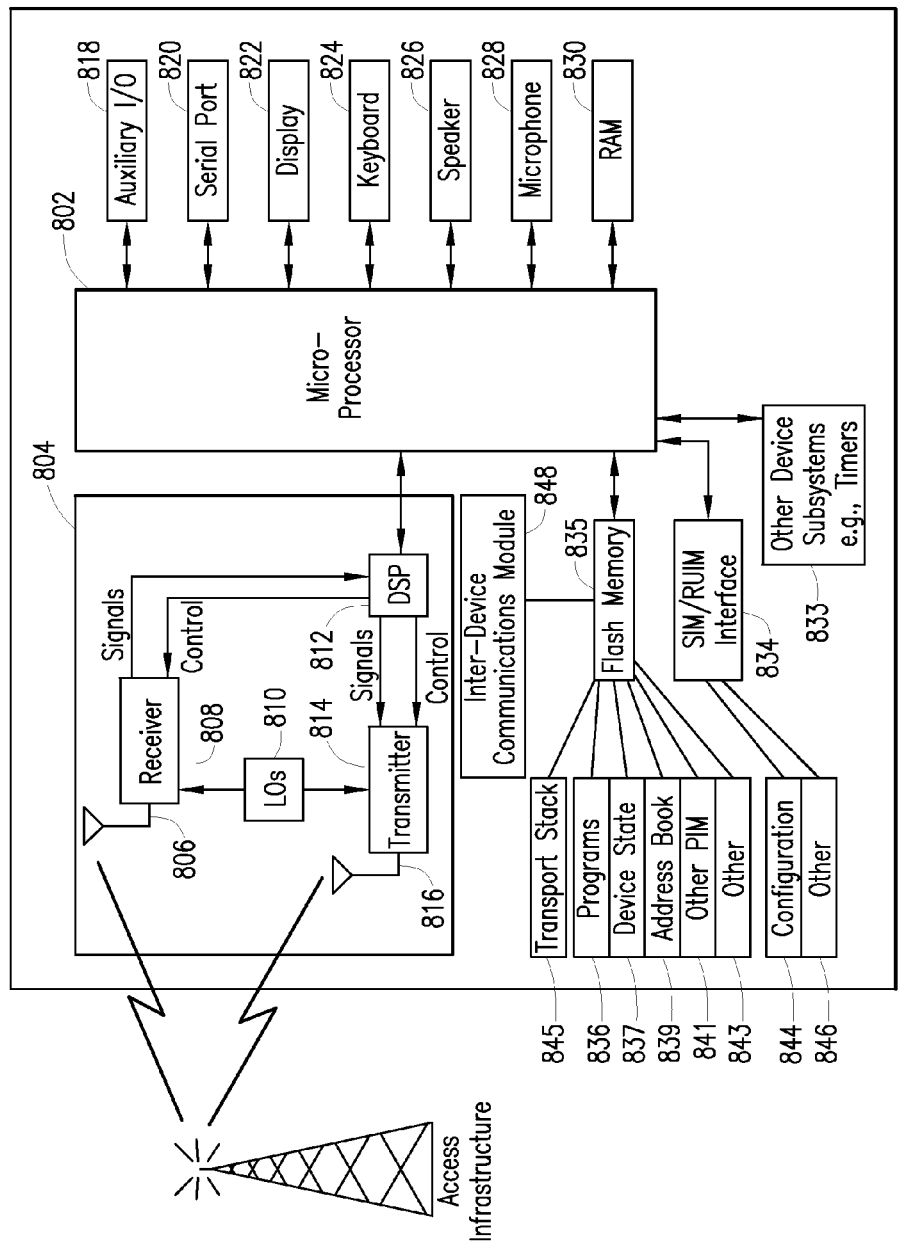
FIG. 8 depicts a block diagram of a User Equipment (UE) device capable of using inter-device communications according to an embodiment of the present disclosure.

FIG. 8 depicts a block diagram of an embodiment of a communications device 800 operable as an UE device, e.g., UE device 120, for purposes of the present patent disclosure. A microprocessor 802 providing for the overall control of an embodiment of the UE device is operably coupled to a communications subsystem 804 that is capable of operation on multiple bands and in multiple access technologies as necessary. The communications subsystem 804 generally includes one or more receivers 808 and one or more transmitters 814 as well as associated components such as one or more local oscillator (LO) modules 810 and a processing module such as a digital signal processor (DSP) 812. As will be apparent to those skilled in the field of communications, the particular design of communications module 804 may be dependent upon the bands and access technologies with which the mobile device is intended to operate (e.g., CDMA, GSM, WLAN, LTE-A, et cetera). Regardless of the particular design, however, signals received by antenna 806 through appropriate access infrastructure are provided to receiver 808, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 812, and provided to transmitter 814 for digital-to-analog (D/A) conversion, frequency up conversion, filtering, amplification and transmission over the air-radio interface via antenna 816. In at least one embodiment, communications module 804 may be duplicated so that mobile communications device 800 is able to operate on several bands simultaneously and may have the capability to operate using multiple-inputs, multiple-outputs (MIMO). In some implementations of the communications modules 804, the receive antenna 806 and the transmit antenna 816 may be combined into a single apparatus and appropriately coupled to the receiver 808 and the transmitter 814. Some implementations may also include multiple antennae for improved performance using techniques such as diversity.

Microprocessor 802 may also interface with further device subsystems such as auxiliary input/output (I/O) 818, serial port 820, display 822, keyboard/keypad 824, speaker 826, microphone 828, random access memory (RAM) 830 and any other device subsystems, e.g., timer mechanisms, generally labeled as reference numeral 833. To control access, an interface 834 may also be provided in communications with the microprocessor 802 with respect to a removable storage module (Universal/Subscriber Identity Module (U/SIM) or Removable User Identity Module (RUIM)). In one implementation, U/SIM or RUIM interface 834 may be operable with a U/SIM or RUIM card having a number of key configurations 844 and other information 846 such as default content disposition profiles, policy managers, alternative network information, as well as identification and subscriber-related data that may supplement local storage-based information. Operating system software and applicable service logic software may be embodied in a persistent storage module (i.e., non-volatile storage) such as Flash memory 835. In one implementation, Flash memory 835 may be segregated into different areas, e.g., storage area for computer programs 836 (e.g., service processing logic), as well as data storage regions such as device state 837, address book 839, other personal information manager (PIM) data 841, and other data storage areas generally labeled as reference numeral 843.

In addition, an inter-device communications module 848 is provided for facilitating one or more embodiments as set forth in detail herein. Inter-device communications module 848 includes logic for setting up, conducting and releasing inter-device communications with one or more UE devices. The manner in which these actions are performed can include a number of variations. For example, in at least one embodiment, e.g., the embodiment of FIG. 2A, UE device 800 sends a call set-up request designating a called UE device to a CSUF that is part of the wireless communications network using standard communications protocols. If the CSUF determines that the calling UE device and called UE device are within range for and capable of inter-device communications, the UE device may receive instructions for setting up inter-device communications with the called wireless UE device. For example, module 848 can receive notifications of a channel for the two UE devices to use, as well as identification, security and protocol information for the two UE devices to carry out secure communications. Inter-device communications module 848 of the calling UE device can be configured to contact the called UE device on the assigned channel to establish inter-device communications. During inter-device communications, UE device 800 continues to monitor the control channel for the network on which the UE device is camped. In this manner, UE device 800 can continue to receive additional calls or data communications as enabled by their service contract with the network. By maintaining contact with the network via the control channel, UE device 800 is also able to inform the network when inter-device communications are completed, so that the channel and other resources are made available for re-use by the network. While both the calling and called UE devices will generally maintain contact with the network, in at least one embodiment the devices are allowed to continue using the inter-device channel as long as one of the two UE devices is in contact with the CSUF. In at least one embodiment, inter-device communications module 848 is configured to track the quality of the communications between the two UE devices and to request transfer of the call to normal cellular channels, i.e., the two UE devices communicating via the network rather than directly, if the quality of the signal falls below a given level.

In at least one embodiment, inter-device communications module 848 is configured to send a call set-up request designating the called wireless UE device to a CSUF that is not part of the user's home network, but is located on a network such as an enterprise network or the Internet. In this embodiment, inter-device communications module 848 is configured to use over-the-top (OtT) communications to contact the CSUF. In some embodiments, requesting service via the CSUF is a routine part of UE device 800 requesting any type of communications with another UE device. That is, all requests for communications with another UE device are initially sent from inter-device communications module 848 to the CSUF. If the CSUF determines that inter-device communications are appropriate, the CSUF will provide inter-device communications module 848 with the appropriate information to proceed with an inter-device call. If the CSUF determines that inter-device communications are not appropriate, inter-device communications module 848 will be informed of this determination and will be instructed to reissue the request directly to the communications network using established protocol. In another embodiment, the user may activate an inter-device communications program in order to request an inter-device channel for communications, e.g., by initiating a specific application, entering a specific code on a keyboard/keypad, or by another mechanism. In at least some embodiments, inter-device communications are more secure than communications conducted via the network and may be preferable for that reason. Accordingly, in at least some embodiments, the user can specify a preference for an inter-device channel or may be able to reject an offered channel via the network if inter-device communications are not available at the time.

The inter-device communications capability may include the use of an additional transceiver in the devices that permits use of inter-device communications channels, or it may be an adaptation of the existing device radios to operate in a suitable mode, e.g., if the radio access technology provides for multiple modes of operation. The UMTS and the LTE system, for example include both FDD and TDD modes of operation. In some cases, for example, the TDD transceiver mode of the device would operate in the device transmit frequency band. This would isolate the other devices from signals being transmitted nearby when they are receiving signals from the base stations in the downlink frequency band of the communications system radio access technology (RAT) Alternatively or additionally, the inter-device communications can use a different band than other communications or a band owned by a different network operator, if appropriate agreements are in place. The inter-device communications capability may also include use of other RAT operating in radio bands outside the normal range of the conventional mobile communications system.

In at least some embodiments, inter-device communications module 848 is configured to form an ad-hoc group with other UE devices within a local area. In this embodiment, inter-device communications module 848 is configured to interact within the ad-hoc group to assist in tracking of other inter-device communications-capable devices in the area that are listening on the inter-device channel, can help other devices locate each other, and help determine the parameters for two or more devices to conduct private communications. In this embodiment, inter-device communications module 848 sends a call set-up request designating the called wireless UE device to a distributed CSUF formed of the ad-hoc group and obtains information for setting up inter-device communications from the distributed CSUF. Module 848 then establishes inter-device communications with the called wireless UE device using a channel designated for direct use between the wireless UE devices.

Regardless of the specific implementation of the CSUF that is employed, inter-device communications module 848 of UE device 800 is able not only to authenticate and provide security services such as encryption with the central network, but is also equipped to perform authentication and security services with other UE devices that are capable of inter-device communications.

Various processes, structures, components and functions set forth above in detail, associated with one or more network nodes or a wireless UE device, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

In summary, the current disclosure provides the ability to set-up inter-device communications between two cellular UE devices. In at least some embodiments, this capability can provide improved efficiency in the use of the radio resources, such as radio spectrum. Direct communications between two UE devices without the need to route the communications through appropriate base stations requires only one channel for the UE-device-to-UE-device communications, instead of the two that would be required if the call was routed conventionally from one device through the base station to the other device, providing an efficiency gain of the order of two for local radio traffic. The use of inter-device communications may also reduce the load on network resources that carry the traffic to the base station controller and core network, as the inter-device communications does not require network backhaul facilities. The network resources then become available for other traffic and may result in reduced costs for the network operator. Inter-device communications can be handled using low power radio communications, which may provide a benefit in reducing the level of radio interference. Reduced interference may enable the reuse of the same channel again in a nearby cell, enabling the network operator to handle additional traffic and receive additional revenue with their assigned radio spectrum and network resources.

In at least some embodiments, the use of inter-device communications can also provide benefits to the user of the UE device. Inter-device communications may reduce the delay in the communications path and so improve the experience for the user of the UE device and the network operator. In addition, use of inter-device communications can be adapted to utilize local communications channels in other radio spectrum band(s) and reduce the traffic in the mobile communications network channels, which may make additional resources available for other traffic, i.e. to devices that are located further away.

Because the disclosed inter-device communications makes use of the signaling capabilities of the mobile communications network, inter-device communications may be "handed-over" to conventional mobile channels if such a handover becomes necessary or desirable. This can occur, for example, when the mobile devices move out of proximity to each other or when issues such as interference or congestion on the inter-device channels become important. In some situations, a second form of hand-over may also be necessary when two UE devices that are engaged in inter-device communications pass from the control of a first base station to the control of a second base station.

The invention claimed is:
1. A wireless user equipment (UE) device comprising:
a component configured to send a call set-up request, using over-the-top (OtT) messaging, to a call set-up function at a network node that is outside both an access network and a core network with which the UE device is operating, the call set-up request designating a called wireless UE device;

a component configured to send a call set-up request to the mobile communications network responsive to receiving a rejection from the CSUF;

a component configured to receive information for setting up inter-device communications with the called wireless UE device sent from the network node using OtT messaging;

a component configured to establish inter-device communications with the called wireless UE device responsive to obtaining the information for setting up inter-device communications with the called wireless UE device, wherein the inter-device communications uses a radio channel operating directly between the calling and called wireless UE devices and uses at least one of a different band, a different radio access technology, and a different network than that used for obtaining the information for setting up inter-device communications; and a component to initiate handover of the inter-device communications to another inter-device channel, wherein the component configured to receive information for setting up inter-device communications comprises a component configured to receive one of timing information and coding information for use in establishing inter-device communications with the called wireless UE device.

2. The wireless UE device of claim 1, wherein the information for setting up inter-device communications includes conditions under which the wireless UE device should cease inter-device communication.

3. The wireless UE device of claim 1, wherein the component configured to receive information for setting up inter-device communications comprises a component configured to receive authentication information for use in establishing the inter-device communications.

4. The wireless UE device of claim 1, further comprising a component configured to inform the call set-up function when the inter-device communications is completed.

5. The wireless UE device of claim 1, wherein at least one of the wireless UE device and the called UE device maintains contact with the call set-up function during inter-device communications.

6. The wireless UE device of claim 1, wherein the information for setting up inter-device communications includes conditions under which the wireless UE device should cease inter-device communication and further wherein at least one of the wireless UE device and the called UE device maintains contact with the call set-up function during inter-device communications.

7. The wireless UE device of claim 1, wherein the component configured to receive information for setting up inter-device communications comprises a component configured to receive authentication information for use in establishing the inter-device communications and further wherein at least one of the wireless UE device and the called UE device maintains contact with the call set-up function during inter-device communications.

8. A method operable on a wireless user equipment (UE) device operating in a wireless network environment, the method comprising:

sending, using over-the-top (OtT) messaging, a call set-up request to a call set-up function at a network node that is outside both an access network and a core network with which the UE device is operating, the call set-up request designating a called wireless UE device;

responsive to receiving a rejection from the CSUF, sending a call set-up request to the mobile communications network, otherwise receiving information for setting up inter-device communications with the called wireless UE device sent from the network node using OtT messaging;

responsive to obtaining the information for setting up inter-device communications with the called wireless UE device, establishing inter-device communications with the called wireless UE device; and initiating handover of the inter-device communications to another inter-device channel;

wherein the inter-device communications uses a radio channel operating directly between the calling and called wireless UE devices and uses at least one of a different band, a different radio access technology, and a different network than that used for obtaining the information for setting up inter-device communications and further wherein the component configured to receive information for setting up inter-device communications comprises a component configured to receive one of timing information and coding information for use in establishing inter-device communications with the called wireless UE device.

9. The method of claim 8, wherein the information for setting up inter-device communications includes conditions under which the wireless UE device should cease inter-device communication.

10. The method of claim 8, wherein obtaining information for setting up inter-device communications comprises receiving authentication information for use in establishing the inter-device communications.

11. The method of claim 8, further comprising informing the call set-up function when the inter-device communications is completed.

12. The method of claim 8, wherein at least one of the calling wireless UE device and the called UE device maintain contact with the call set-up function during the inter-device communications.

13. A computer program product stored on a non-transitory computer readable media and operable for execution on a wireless user equipment (UE) device, the computer program product comprising:

instructions for sending, using over-the-top (OtT) messaging, a call set-up request to a call set-up function at a network node that is outside both an access network and a core network with which the UE device is operating, the call set-up request designating a called wireless UE device;

instructions for sending a call set-up request to the mobile communications network responsive to receiving a rejection from the CSUF;

instructions for receiving information for setting up inter-device communications with the called wireless UE device sent from the network node using OtT messaging;

instructions for establishing inter-device communications with the called wireless UE device responsive to obtaining the information for setting up inter-device communications with the called wireless UE device; and instructions for initiating handover of the inter-device communications to another inter-device channel, wherein the component configured to receive information for setting up inter-device communications comprises a component configured to receive one of timing information and coding information for use in establishing inter-device communications with the called wireless UE device and further wherein the inter-device communications uses a radio channel operating directly between the calling and called wireless UE devices and uses at least one of a different band, a different radio access technology and a different network than that used for obtaining information for setting up the inter-device communications.

14. The computer program product of claim 13, wherein the information for setting up inter-device communications includes conditions under which the wireless UE device should cease inter-device communication.

15. The computer program product of claim 13, wherein the instructions for receiving information for setting up inter-device communications comprises instructions for receiving authentication information for use in establishing the inter-device communications.

16. The computer program product of claim 13, further comprising instructions for informing the call set-up function when the inter-device communications is completed.

17. The computer program product of claim 13, wherein at least one of the wireless UE device and the called UE device maintains contact with the call set-up function during inter-device communications.

* * * * *